(12) United States Patent
Fletcher

(10) Patent No.: US 10,673,637 B1
(45) Date of Patent: Jun. 2, 2020

(54) POLYMORPHIC DIGITAL SECURITY AND METHODS OF USE THEREOF

(71) Applicant: Quantum Information Security, LLC, Everett, WA (US)

(72) Inventor: Timothy Fletcher, Everett, WA (US)

(73) Assignee: Quantum Information Security, LLC, Everett, WA (US)

( * ) Notice: Subject to any disclaimer, the term of this patent is extended or adjusted under 35 U.S.C. 154(b) by 0 days.

(21) Appl. No.: 16/688,793

(22) Filed: Nov. 19, 2019

(51) Int. Cl.
| | | |
|---|---|---|
| H04L 29/06 | (2006.01) | |
| H04L 9/32 | (2006.01) | |
| H04L 9/06 | (2006.01) | |
| H04L 9/30 | (2006.01) | |
| H04L 9/08 | (2006.01) | |

(52) U.S. Cl.
CPC .......... *H04L 9/3247* (2013.01); *H04L 9/0625* (2013.01); *H04L 9/0872* (2013.01); *H04L 9/3026* (2013.01); *H04L 2209/34* (2013.01)

(58) Field of Classification Search
CPC ... H04L 9/3247; H04L 9/0625; H04L 9/3026; H04L 9/0872; H04L 2209/34
See application file for complete search history.

(56) References Cited

U.S. PATENT DOCUMENTS

| | | | | | |
|---|---|---|---|---|---|
| 5,862,325 | A * | 1/1999 | Reed | ...................... | H04L 29/06 704/270.1 |
| 6,142,684 | A * | 11/2000 | Kirshenbaum | ....... | G06F 9/4492 717/143 |
| 7,246,240 | B2 * | 7/2007 | Chuang | .................. | H04L 9/0852 380/256 |
| 7,533,268 | B1 * | 5/2009 | Catorcini | .............. | H04L 9/3247 713/168 |
| 8,479,291 | B1 * | 7/2013 | Bodke | ................... | G06F 21/562 713/188 |
| 9,189,629 | B1 * | 11/2015 | Nachenburg | ............ | G06F 21/12 |
| 10,255,435 | B1 * | 4/2019 | Kamble | .................. | G06F 21/56 |
| 10,491,627 | B1 * | 11/2019 | Su | .......................... | H04L 63/145 |
| 2006/0230453 | A1 * | 10/2006 | Flynn | .................... | G06F 21/125 726/24 |
| 2009/0125445 | A1 * | 5/2009 | Mousavi | ................. | G06F 21/10 705/59 |
| 2009/0158433 | A1 * | 6/2009 | Li | ....................... | H04L 63/1416 726/24 |
| 2009/0265558 | A1 * | 10/2009 | Izu | ........................ | H04L 9/3236 713/176 |
| 2010/0067691 | A1 * | 3/2010 | Lin | ..................... | H04N 1/32144 380/55 |
| 2010/0122088 | A1 * | 5/2010 | Oxford | ................... | G06F 21/10 713/168 |
| 2010/0185867 | A1 * | 7/2010 | Izu | ........................ | H04L 9/3236 713/176 |
| 2010/0281260 | A1 * | 11/2010 | Farrugia | ............... | H04L 9/3236 713/170 |

(Continued)

*Primary Examiner* — John B King
(74) *Attorney, Agent, or Firm* — Reinhart Boerner Van Deuren s.c.

(57) ABSTRACT

Described herein are various methods of generating and using a digital signature, such as a polymorphic digital signature. One or more methods of creating a digital signature permit strings of characters, which may be simple or complex, to uniquely identify large numbers of people, things, and actions. Different people, things, and actions can use the same set of characters to identify themselves and yet still be uniquely identified.

20 Claims, 3 Drawing Sheets

(56) References Cited

U.S. PATENT DOCUMENTS

| | | | |
|---|---|---|---|
| 2012/0155646 A1* | 6/2012 | Seshadri | H04L 9/083 380/279 |
| 2016/0011992 A1* | 1/2016 | Sandoz | G06F 3/0622 711/163 |
| 2017/0193229 A1* | 7/2017 | Roychowdhury | G06F 21/564 |
| 2017/0214701 A1* | 7/2017 | Hasan | H04L 63/1408 |
| 2017/0250819 A1* | 8/2017 | Hoffstein | H04L 9/3247 |
| 2018/0198801 A1* | 7/2018 | Gopalakrishna | H04L 63/1491 |

* cited by examiner

US 10,673,637 B1

POLYMORPHIC DIGITAL SECURITY AND METHODS OF USE THEREOF

BACKGROUND OF THE INVENTION

The present invention relates generally to digital security. The present invention relates specifically to a method of creating secure digital signatures.

The process of data verification has been utilized since the days of telegraphs. As new processes have been developed to provide data and user authentication, so have processes continually developed to undermine those efforts. Many of the current methods to generate a unique signature are relatively easy to crack because the range of possible signatures is small enough to permit hacking via a rainbow table, or cumbersome to implement and use.

SUMMARY OF THE INVENTION

According to one embodiment, several aspects of this disclosure relate to a method of generating a polymorphic digital signature. The method includes receiving an original set of data and optionally padding the data to be a target packet size. A mask is created based on user input and/or random data. An initial digital signature is generated based on the data and the mask. The digital signature is encrypted, part of the digital signature is discarded according to a shape shift map, with the discarded portions being replaced by padding data, and the result is a polymorphic digital signature.

Another method of using this disclosure includes receiving data, compressing the data, and optionally padding the data. A mask is created based on user input and/or random data. An initial digital signature is generated based on the compressed data and the mask. The digital signature is encrypted, a shape shifter array map is applied to the encrypted digital signature, and the result is a polymorphic digital signature.

Another method of using this disclosure includes receiving data and optionally padding the data to become a multiple of a target packet size. A random number is generated from a timestamp, and a digital signature is created based in part on the random number. The digital signature is encrypted, a shape shifter array map is applied to it, and the result is a polymorphic digital signature.

The accompanying drawings are included to provide further understanding and are incorporated in and constitute a part of this specification. The drawings illustrate one or more embodiments and, together with the description, serve to explain the principles and operation of the various embodiments.

DETAILED DESCRIPTION

Referring generally to the figures, described herein are various methods of generating and using a digital signature, such as a polymorphic digital signature. Applicant has observed that many different forms of generating digital signatures have an issue with being susceptible to being hacked by a rainbow table. One approach to address that problem is to require unique strings of characters (e.g., a combination of letters, numbers, and symbols). However, this requires the user to remember and store increasingly complex unique identifiers. The digital signature described herein overcomes that problem by allowing not only relatively simple strings of characters to be used to uniquely identify people, but different people can use the same strings of characters and still be differentiated.

Figure 1:
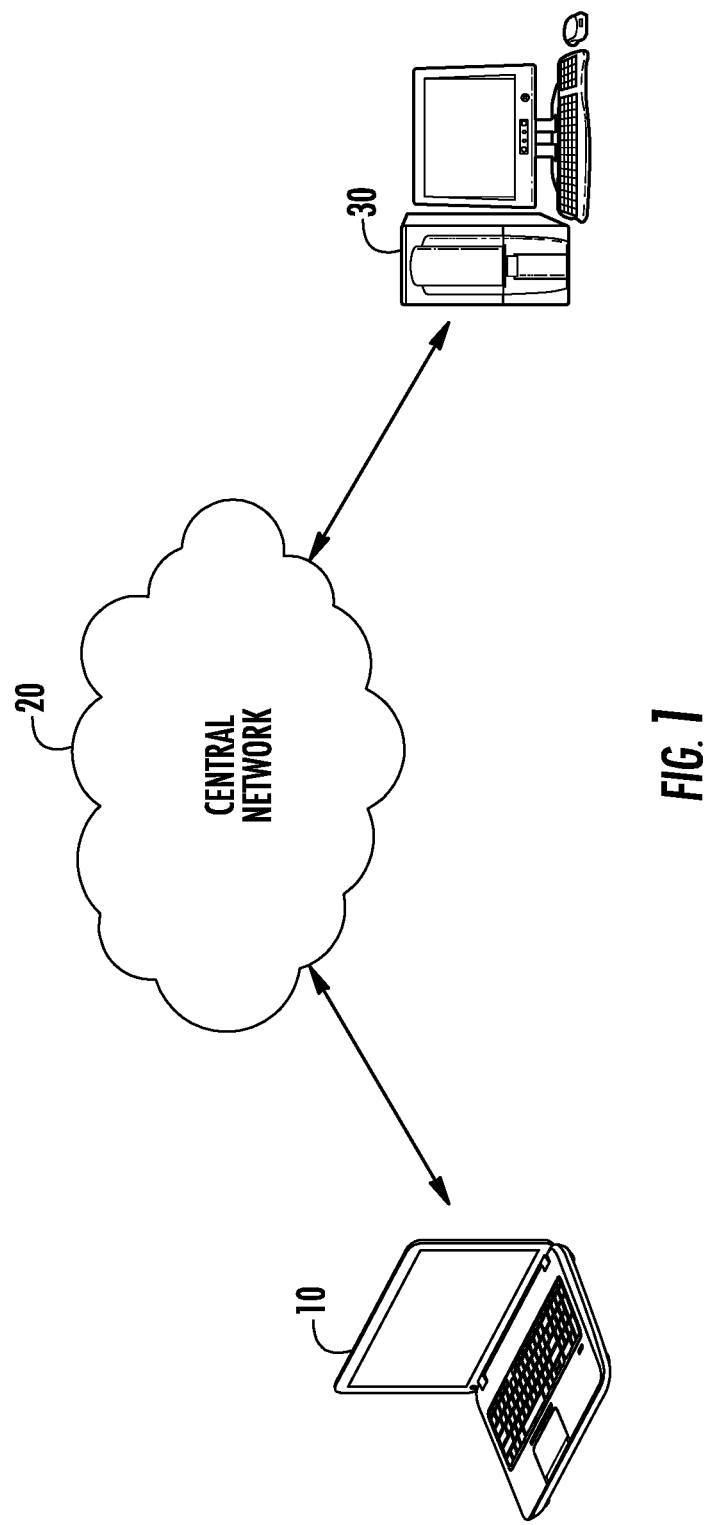
FIG. 1 is a schematic view of a networking environment that utilizes the processes described herein, according to an exemplary embodiment.

Referring to FIG. 1, in various embodiments, computer 10 and computer 30 are in communication via computer network 20. In use, a first user at computer 10 generates a polymorphic digital signature and communicates the polymorphic digital signature to second user at computer 30 via computer network 20. The second user generates a confirmatory digital signature for the first user and compares the confirmatory digital signature to the original polymorphic digital signature. Based on the comparison, the second user at computer 30 confirms the identity of the first user at computer 10.

Figure 2:
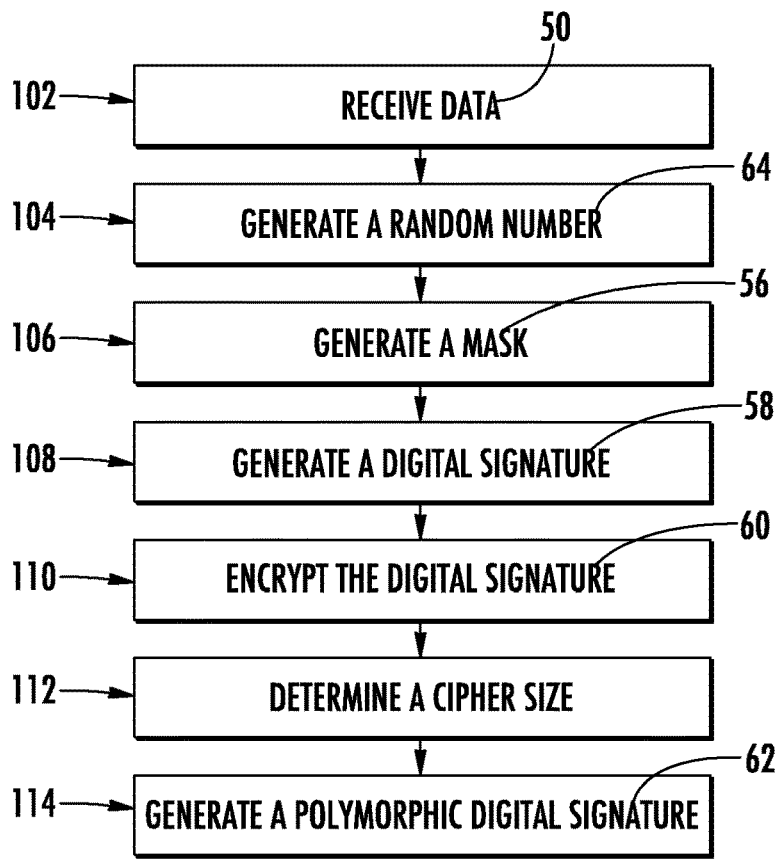
FIG. 2 is a method of generating a polymorphic digital signature, according to an exemplary process.

Turning to FIG. 2, various aspects of a method of generating a polymorphic digital signature are depicted. Starting at step 102, original data 50 is received by a computer, such as computer 10. In various examples the original data 50 includes general data and personalized data. For exemplary purposes only and without limitation the general data may be one or more of a file with video and audio (e.g., a movie), an audio file, a PDF, a book and/or an image, and the personalized data may be one or more of a password, a private key and/or any other personalized data. For example, personalized data may identify or correspond to a person, group of people, an electronic object (e.g., a specific computer, including a cell phone, smart watch, etc.), and/or a group of electronic objects.

Moving to step 104, random number 64 is received, such as by being generated. It is understood herein that there are varying degrees of the randomness of random numbers, such as random number 64. Along those lines, as used herein it is understood that random number 64 is sufficiently random as that phrase would be understood by those skilled in the art.

One exemplary non-limiting example of generating a sufficiently random number is by receiving a timestamp from a computer. The timestamp is parsed so that only the millionths of a second are used (e.g., if the timestamp is Oct. 1, 2019, 15:21.486,267 EST, the subset of the timestamp used would be the trailing "7" that identifies the millionths of a second). Unless the request for the timestamp was immediately preceded or followed by another event or command that might indicate the precise timing of the timestamp, the millionths of a second of the timestamp would be sufficiently random for one or more embodiments that practice this disclosure.

Turning to step 106, a mask 56 is identified, such as by being generated. In one example, a default mask 56 is used and applied to the input data, such as the original data 50. The default mask 56 is applied to the original data 50 by identifying a first portion of the data (e.g., the first byte), adding the default mask to the first portion of the data, and adjusting that resultant value until it is less than 256 by repeatedly subtracting 256, at which point the result is placed in the corresponding portion of the digital signature 58. This process is repeated until the entire digital signature 58 is created.

In another example, the default mask 64 comprises a number of bytes, such as 1,024 bytes, which are added to 1,024 byte-sized packets in original data 50. For example, the first byte in the default mask 64 is added to the first byte in the 1,024 byte-sized packet from original data 50, the second byte in the default mask 64 is added to the second byte in the 1,024 byte-sized packet from original data 50, etc. Each of the resultant sums are adjusted to be less than 256 by repeatedly subtracting 256 from the sum until the result is less than 256, and the result is then placed back in the corresponding portion of the digital signature 58. This process is repeated until the entire digital signature 58 is created.

In yet another example, the mask 56 is supplied by a user. It is contemplated herein that the mask 56 may be any size, such as a single byte, 1,024 bytes, etc.

Moving to step 110, after digital signature 58 is created then an encryption method is selected. Digital signature 58 is encrypted using the selected encryption method to generate encrypted digital signature 60.

Moving to step 112, a cipher size is determined (e.g., 16, 24 or 32 bytes) and a shape shifter array map 68 is identified based on the cipher size. The shape shifter array map is utilized to discard and replace a portion of encrypted digital signature 60 with padding data (e.g., all zeros, all ones, a random assortment of zeros and ones). In one example where the cipher size is 16 bytes, for each packet of 1,024 bytes in the encrypted digital signature 60, five consecutive bytes are removed and replaced with padding data at the following locations: at 19 bytes from the start of the 1,024 bytes, at 86 bytes from the start of the 1,024 bytes, at 153 bytes from the start of the 1,024 bytes, and at 220, 287, 354, 421, 488, 555, 622, 689, 756, 823, 890, and 957.

In another example where the cipher size is 24 bytes, for each packet of 1,024 bytes in the encrypted digital signature 60, a single byte is removed and replaced with padding at the following locations: at 35 bytes from the start of the 1,024 bytes, at 78 bytes from the start of the 1,024 bytes, at 121 bytes from the start of the 1,024 bytes, and at 164, 207, 250, 293, 336, 379, 422, 465, 508, 551, 594, 637, 680, 723, 766, 809, 852, 895, 938, and 981.

In another example where the cipher size is 32 bytes, for each packet of 1,024 bytes in the encrypted digital signature 60, a single byte is removed and replaced with padding at the following locations: at 33 bytes from the start of the 1,024 bytes, at 64 bytes from the start of the 1,024 bytes, at 96 bytes from the start of the 1,024 bytes, at 128 bytes from the start of the 1,024 bytes, at 160, 192, 224, 256, 288, 320, 352, 384, 416, 448, 480, 512, 544, 576, 608, 640, 672, 704, 736, 768, 800, 832, 864, 896, 928, 960, and 992.

Although specific locations to discard portions of encrypted digital signature 60 and replace with padding were identified in these examples according to the exemplary shape shifter array maps 68, it is contemplated herein that any locations within encrypted digital signature 60 may be used. It is further contemplated that discarded portions of encrypted digital signature 60 may be individual bits or collections of bits rather than discarding and replacing entire bytes.

Turning to step 114, the result is a polymorphic digital signature 62. The polymorphic digital signature 62 may be used, for example, to verify and/or identify the originating party of the original data 50.

Figure 3:
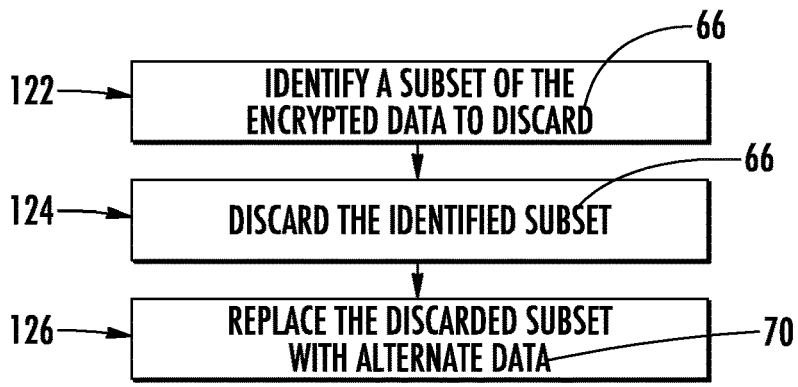
FIG. 3 is a method of modifying data, according to an exemplary series of processes.

Turning to FIG. 3, various aspects of discarding data, such as encrypted digital signature 60, are shown. Starting at step 122, a subset 66 of encrypted data to discard is identified. For example, the subset 66 could be identified the similar as or the same to how a portion of encrypted digital signature 60 is identified to be discarded in step 112 in FIG. 2. Specifically, in various embodiments a shape shifter array map 68 may be used.

It is contemplated herein that the subset 66 of encrypted data to discard may include entire bytes of the data, continuous bytes of the data (e.g., 2-10 continuous bytes), individual bits of the data, continuous bits of the data that is less than a byte (e.g., 2-7 bits of data), and/or continuous bits of the data that are not necessarily one or more entire bytes.

Turning to steps 124 and 126, the identified subset 66 is discarded and replaced with alternate data 70. In various embodiment alternate data is all ones, all zeros, or a combination, such as a random combination, thereof.

Figure 4:
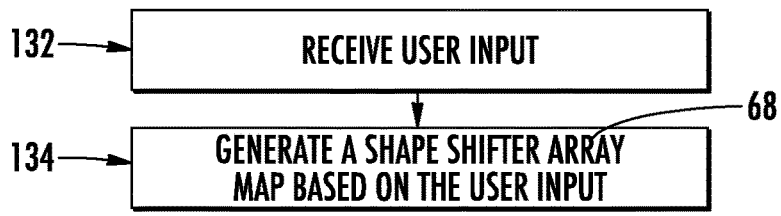
FIG. 4 is a method of generating an array map, according to an exemplary process.

Turning to FIG. 4, various aspects of generating a shape shifter array map 68 are shown. Starting at step 132, user input is received. The user input indicates whether to use a default shape shifter map 68 (e.g., the shape shifter maps 68 discussed in step 112 in FIG. 2), or to use a shape shifter array map 68 based on the user input. For example, a user may input a new shape shifter array map 68. As another example, a user may provide an input that is used to generate a shape shifter array map 68.

Figure 5:
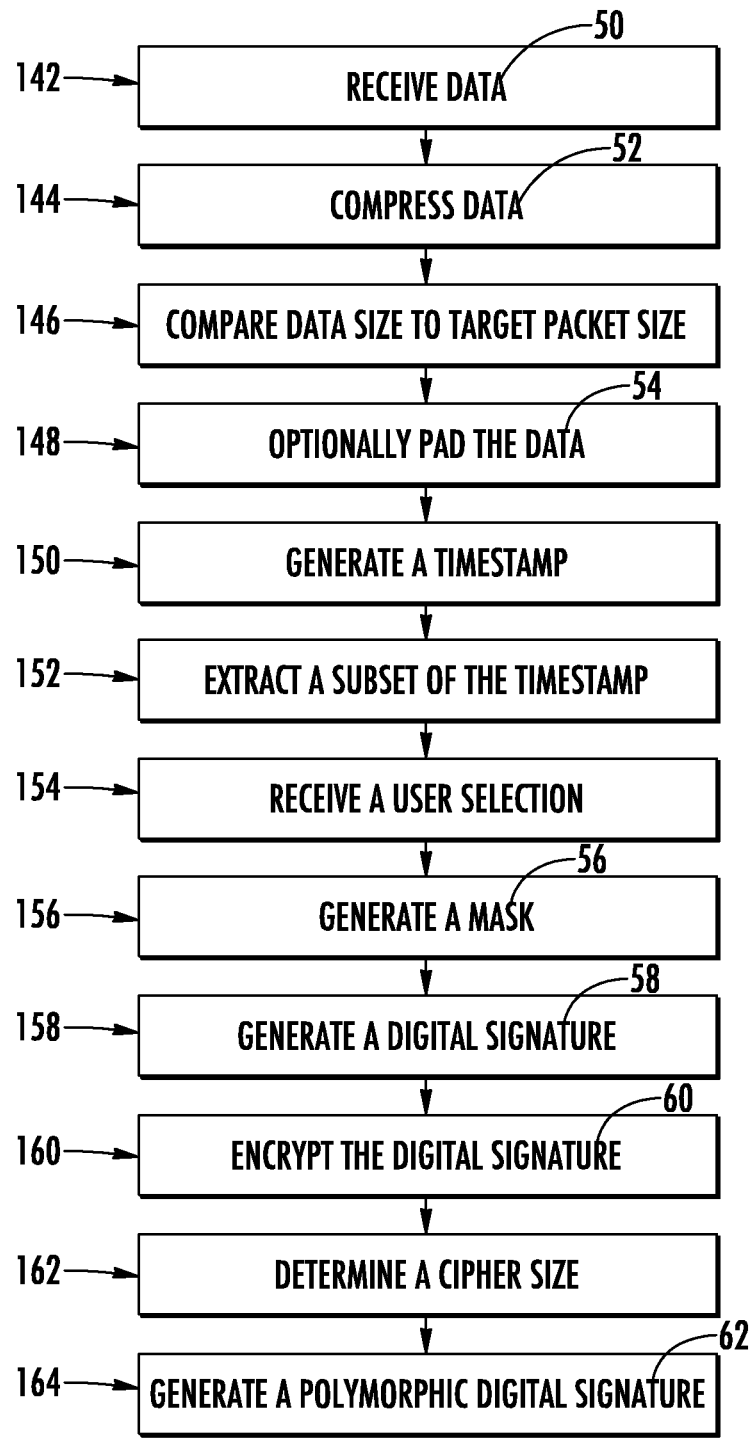
FIG. 5 is a method of generating a polymorphic digital signature, according to an exemplary process.

Turning to FIG. 5, various aspects of another exemplary method of generating a polymorphic digital signature 62 are depicted. Starting at step 142, original data 50 is received. Moving to steps 142, 144, and 146, original data 50 is compressed to become compressed data 52, and compressed data 52 is compared to a target data packet size to identify a multiple of the target data packet size. For exemplary purposes only, if compressed data 52 is 72 bytes and target packet size is 32 bytes, the target total size of compressed data 52 is 96 bytes, which is the first multiple of target packet size (32 in this example) that is larger than the size of the compressed data 52. In another example, if compressed data 52 is 45 bytes and the target packet size is 16 bytes, the target total size of compressed data 52 is 48 bytes, which is the first multiple of target packet size (16 in this example) that is larger than the size of the compressed data 52.

In both of those example, the target total size is the first multiple of the target packet size that is larger than the size of the compressed data 52. However, it is contemplated herein that the target total size may be any multiple of the target packet size that is larger than the size of the compressed data 52 (e.g., the second multiple of the target packet size larger than the size of the compressed data 52, the third such multiple of the target packet size, the fourth such multiple of the target packet size, etc.).

Moving to steps 146 and 148, the compressed data is padded so that the size matches the total target size that was identified at step 104. In one example, padding data is appended to the compressed data. In another example, padding data is prepended to the compressed data. In yet another example, part of padding data is prepended to compressed data and the remainder of padding data is appended to compressed data. In yet another example, at least part of padding data is added to a middle portion of compressed data.

Moving to steps 150 and 152, a random number is generated. In one example, a timestamp is parsed so that only the millionths of a second are used (e.g., if the timestamp is Oct. 1, 2019, 15:21.486,267 EST, the subset of the timestamp used would be the trailing "7" that identifies the millionths of a second). Unless the request for the timestamp was immediately preceded or followed by another event or command that might indicate the precise timing of the timestamp, the millionths of a second of the timestamp would be sufficiently random for one or more embodiments that practice this disclosure.

Moving to steps 154, 156, and 158, user input is received and a mask 56 is generated based in part on the user input. In one example, a default mask 56 is used and applied to the input data, such as the original data 50. The default mask 56 is applied to the original data 50 by identifying a first portion of the data (e.g., the first byte), adding the default mask to the first portion of the data, and adjusting that resultant value until it is less than 256 by repeatedly subtracting 256, at which point the result is placed in the corresponding portion of the digital signature 58. This process is repeated until the entire digital signature 58 is created.

In another example, the default mask 64 comprises a number of bytes, such as 1,024 bytes, which are added to 1,024 byte-sized packets in original data 50. For example, the first byte in the default mask 64 is added to the first byte in the 1,024 byte-sized packet from original data 50, the second byte in the default mask 64 is added to the second byte in the 1,024 byte-sized packet from original data 50, etc. Each of the resultant sums are adjusted to be less than 256 by repeatedly subtracting 256 from the sum until the result is less than 256, and the result is then placed back in the corresponding portion of the digital signature 58. This process is repeated until the entire digital signature 58 is created.

Moving to step 160, after digital signature 58 is created then an encryption method is selected. Digital signature 58 is encrypted using the selected encryption method to generate encrypted digital signature 60.

Moving to step 162, a cipher size is determined (e.g., 16, 24 or 32 bytes) and a shape shifter array map 68 is identified based on the cipher size. The shape shifter array map is utilized to discard and replace a portion of encrypted digital signature 60 with padding data (e.g., all zeros, all ones, a random assortment of zeros and ones). Although several specific examples of cipher sizes are provided, it is contemplated herein that many other cipher sizes may also be used and practice the spirit of this disclosure.

In one example where the cipher size is 16 bytes, for each packet of 1,024 consecutive bytes in the encrypted digital signature 60, five consecutive bytes are removed and replaced with padding data at the following locations: at 19 bytes from the start of the 1,024 bytes, at 86 bytes from the start of the 1,024 bytes, at 153 bytes from the start of the 1,024 bytes, and at 220, 287, 354, 421, 488, 555, 622, 689, 756, 823, 890, and 957.

In another example where the cipher size is 24 bytes, for each packet of 1,024 bytes in the encrypted digital signature 60, a single byte is removed and replaced with padding at the following locations: at 35 bytes from the start of the 1,024 bytes, at 78 bytes from the start of the 1,024 bytes, at 121 bytes from the start of the 1,024 bytes, and at 164, 207, 250, 293, 336, 379, 422, 465, 508, 551, 594, 637, 680, 723, 766, 809, 852, 895, 938, and 981.

In another example where the cipher size is 32 bytes, for each packet of 1,024 bytes in the encrypted digital signature 60, a single byte is removed and replaced with padding at the following locations: at 33 bytes from the start of the 1,024 bytes, at 64 bytes from the start of the 1,024 bytes, at 96 bytes from the start of the 1,024 bytes, at 128 bytes from the start of the 1,024 bytes, at 160, 192, 224, 256, 288, 320, 352, 384, 416, 448, 480, 512, 544, 576, 608, 640, 672, 704, 736, 768, 800, 832, 864, 896, 928, 960, and 992.

Although specific locations to discard portions of encrypted digital signature 60 and replace with padding were identified in these examples according to the exemplary shape shifter array maps 68, it is contemplated herein that any locations within encrypted digital signature 60 may be used. It is further contemplated that discarded portions of encrypted digital signature 60 may be individual bits or collections of bits rather than discarding and replacing entire bytes.

Turning to step 164, the result is a polymorphic digital signature 62. The polymorphic digital signature 62 may be used, for example, to verify and/or identify the originating party of the original data 50.

In various embodiments computer 10 and/or computer 30 include one or more of a processor, a memory, an output interface, and an input interface. The one or more of a processor is one or more of a general processor unit, an ASIC, a Field Programmable Gate Array (FPGA), firmware and/or a graphics processor. The memory is one or more of a hard drive, a RAM, and/or a processor cache. The output interface is one or more of a network interface card, and/or a display. The input interface is one or more of a keyboard, a mouse, a network interface card (which may also function as an output interface card), and/or touchscreen display. It is further considered herein that computer network 20 may be one or more of an intranet, the Internet, and/or any electronic network of one or more computing devices. Although a laptop and a desktop computer are shown in FIG. 1, it is contemplated herein that any computer device may practice this disclosure, including, for exemplary purposes only and without limitation, a cell phone, a smart watch, a tablet, a laptop, and/or a desktop.

In a specific embodiment the steps of this disclosure are practiced by a system, such as a computing device, that includes at least one processor and a memory storing instructions that, when executed by the at least one processor, cause the system to perform one or more of the steps and/or processes described herein.

In another specific embodiment a system, such as a computing device, includes at least one processor and a memory, such as a non-transitory computer readable storage medium including instructions that, when executed by the at least one processor, cause the system to perform one or more of the steps and/or processes described herein.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A method of generating a polymorphic digital signature comprising:
   receiving initial data;
   generating pre-conversion data based on the initial data, the pre-conversion data having an initial size;
   identifying a target size;
   comparing the initial size of the pre-conversion data to the target size to determine whether the initial size of the pre-conversion data is an integer multiple of the target size;
   adding data padding to the pre-conversion data when the initial size of the pre-conversion data is not an integer multiple of the target size;
   receiving user input data;
   receiving data representative of random data;
   generating a mask based on at least one of the user input data and the data representative of random data;
   generating an initial digital signature based on the pre-conversion packet of data and the mask;
   selecting an encryption method;
   encrypting the initial digital signature using the selected encryption method to generate encrypted data;
   determining a cipher size based on the selected encryption method;
   generating a shape shifter array map based on the cipher size; and
   generating a polymorphic digital signature based on the encrypted data and the shape shifter array map.

2. The method of claim 1, further comprising:
   compressing the initial data into compressed data that has a size less than the initial data;
   wherein the pre-conversion packet of data comprises the compressed data, and wherein the step of comparing the initial size to the target size comprises determining a size of the compressed data.

3. The method of claim 1, wherein the step of generating a polymorphic digital signature based on the encrypted data and the shape shifter array map comprises:
   identifying a subset of the encrypted data to discard;
   discarding the identified subset of the encrypted data; and
   replacing the discarded subset with a portion of the shape shifter array map.

4. The method of claim 3, wherein the discarded subset of the encrypted data is non-contiguous.

5. The method of claim 3, wherein the discarded subset of the encrypted data is selected based on a pre-existing displacer map.

6. The method of claim 1, further comprising:
   receiving second user input data;
   wherein the step of generating the shape shifter array map is based on the cipher size and the second user input data.

7. The method of claim 1, wherein the selected encrypted method is selected from the group consisting of Blowfish, PGP, CBC, DES, IDEA, and Rijndael.

8. The method of claim 1, wherein the data representative of random data is generated based on a time stamp.

9. The method of claim 1, wherein the step of generating the mask comprises:
   generating a mask based on the user input data and the subset data of the time data.

10. The method of claim 1, wherein the step of generating the initial digital signature comprises iteratively processing the pre-conversion packet of data based on the mask.

11. The method of claim 1, wherein each iteration of the step of iteratively processing the pre-conversion packet of data based on the mask comprises referring to at least a majority of the mask.

12. A method of generating a polymorphic digital signature comprising:
   receiving initial data;
   compressing the initial data into compressed data that has a size less than the initial data;
   selecting a mask;
   generating an initial digital signature based on the compressed data and the mask;
   selecting an encryption method;
   encrypting the initial digital signature using the selected encryption method, thereby generating encrypted data;
   generating a shape shifter array map; and
   generating a polymorphic digital signature based on the encrypted data and the shape shifter array map.

13. The method of claim 12, wherein the step of generating a polymorphic digital signature based on the encrypted data and the shape shifter array map comprises:
   identifying a subset of the encrypted data to discard;
   discarding the identified subset of the encrypted data, wherein the discarded subset of the encrypted data is non-contiguous; and
   replacing the discarded subset of the encrypted data with a portion of the shape shifter array map.

14. The method of claim 12, wherein the mask is selected in part based on a random number.

15. The method of claim 12, further comprising:
   generating a time data; and
   extracting a subset data from the time data;
   wherein the step of selecting the mask comprises generating a mask based on user input data and the subset data of the time data.

16. The method of claim 12, wherein the step of selecting the mask comprises:
   selecting a pre-existing mask.

17. The method of claim 12, wherein the step of generating the initial digital signature comprises iteratively processing the pre-conversion packet of data based on the mask.

18. A method of generating a polymorphic digital signature comprising:
receiving initial data;
generating pre-conversion data based on the initial data, the pre-conversion data having an initial size;
identifying a target size;
comparing the initial size of the pre-conversion data to the target size to determine whether the initial size of the pre-conversion data is an integer multiple of the target size;
adding data padding to the pre-conversion data when the initial size of the pre-conversion data is not an integer multiple of the target size;
generating time data;
extracting subset data from the time data, wherein the subset data of the time data corresponds to a length of time that is less than a second;
selecting a mask based on the subset data of the time data;
generating an initial digital signature based on the pre-conversion packet of data and the mask;
selecting an encryption method;
encrypting the initial digital signature using the selected encryption method, thereby generating encrypted data;
determining a cipher size based on the selected encryption method;
receiving user input data;
generating a shape shifter array map based on the cipher size and the user input data; and
generating a polymorphic digital signature based on the encrypted data and the shape shifter array map.

19. The method of claim 18, further comprising:
compressing the initial data into compressed data that has a size less than the initial data;
wherein the pre-conversion packet of data comprises the compressed data, and wherein the step of comparing the initial size to the target size comprises determining a size of the compressed data; and
wherein the step of generating a polymorphic digital signature based on the encrypted data and the shape shifter array map comprises:
identifying a subset of the encrypted data to discard;
discarding the identified subset, wherein the discarded subset of the encrypted data is non-contiguous; and
replacing the discarded subset with a portion of the shape shifter array map.

20. The method of claim 18, wherein the step of generating the initial digital signature comprises iteratively processing the pre-conversion packet of data based on the mask.

\* \* \* \* \*